United States Patent

Bohner et al.

[11] Patent Number: 6,076,627
[45] Date of Patent: Jun. 20, 2000

[54] POWER STEERING FOR MOTOR VEHICLES

[75] Inventors: Hubert Bohner, Boeblingen; Martin Moser, Fellbach, both of Germany

[73] Assignee: DaimlerChrysler AG, Stuttgart, Germany

[21] Appl. No.: 09/068,081

[22] PCT Filed: Oct. 31, 1996

[86] PCT No.: PCT/EP96/04734

§ 371 Date: Aug. 3, 1998

§ 102(e) Date: Aug. 3, 1998

[87] PCT Pub. No.: WO97/17247

PCT Pub. Date: May 15, 1997

[30] Foreign Application Priority Data

Nov. 3, 1995 [DE] Germany ............ 195 40 956

[51] Int. Cl.⁷ .................................................. B62D 5/06
[52] U.S. Cl. ............................................ 180/422; 180/403
[58] Field of Search ........................... 180/403, 421, 180/422, 423, 442, 427, 446

[56] References Cited

U.S. PATENT DOCUMENTS

| 4,473,128 | 9/1984 | Nakayama et al. ......... 180/142 |
| 4,476,529 | 10/1984 | Nakamura et al. ......... 364/424 |
| 4,626,994 | 12/1986 | Yabe et al. ......... 364/424 |
| 4,702,335 | 10/1987 | Cage et al. ......... 180/142 |
| 5,320,191 | 6/1994 | Sudo et al. ......... 180/132 |

FOREIGN PATENT DOCUMENTS

| 44 09 928 A1 | 9/1995 | Germany . |
| 3-295765 | 11/1990 | Japan . |
| 4-19271 | 1/1992 | Japan . |
| 90/12723 | 1/1990 | WIPO . |

*Primary Examiner*—Kevin Hurley
*Assistant Examiner*—Kevin McKinley
*Attorney, Agent, or Firm*—Evenson McKeown Edwards & Lenahan P.L.L.C.

[57] ABSTRACT

A power steering system for automobiles has a mechanical drive connection between a steering device and a steering gear arrangement for steering of vehicle wheels. The drive connection can be separated by opening a connection. In that event, the steering device is connected to the steering gear arrangement only indirectly, in that only nominal values for the steering angle of the wheels steering the vehicle are specified as a function of the adjusting travel of and/or the adjusting speed of the steering device, and the servo motor is actuated by a separate control valve arrangement.

12 Claims, 1 Drawing Sheet

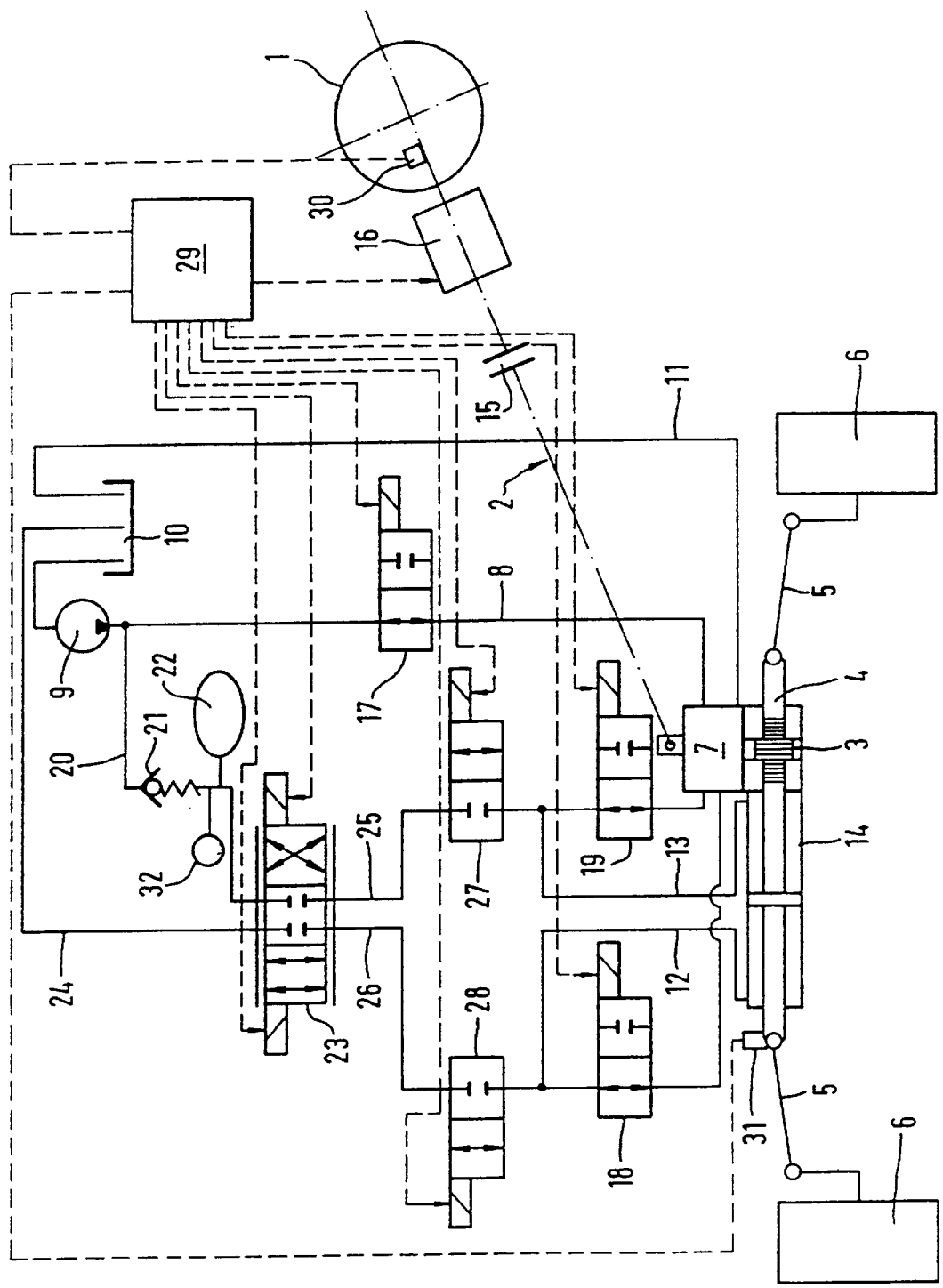

POWER STEERING FOR MOTOR VEHICLES

This application claims the priority of German application 195 40 956.6 and PCT/EP96/04734, filed Nov. 3, 1995 and Oct. 31, 1996, respectively, the disclosure of which are expressly incorporated by reference herein.

BACKGROUND AND SUMMARY OF THE INVENTION

The present invention relates to power steering for automobiles with a mechanical drive connection between a steering device, particularly a steering wheel, and a steering gear arrangement for steering of vehicle wheels, a servo motor coupled with the steering gear arrangement and a connection for separating the drive connection. The servo motor is controllable over a control valve which, in turn, can be controlled by a control system as a function of a difference between a first value, correlated with the steering angle of the vehicle wheels, and at least one second value, correlated with the adjusting travel of the steering device. A servo valve additionally is connected with the drive connection and analogous thereto, can be controlled by the forces or moments transferred by the drive connection, over which servo valve the servo motor can be connected in a controllable manner with delivery and low-pressure connections. Thereby, the servo motor produces a servo power reducing the actuation force necessary at the steering device and the servo motor being connected through a reversing valve arrangement either to the motor connections of the control valve or to the motor connections of the servo valve.

Such power steering arrangements are known from JP-A-40 19271. Steering arrangements of this type have two operating states. In one operating state, a mechanical forced connection is provided between the steering device and the steered vehicle wheels whereby, as a function of the forces transferred between the steered vehicle wheels and the steering device, a servo valve is controlled which, in turn, actuates a hydraulic servo motor. In this operating state, the steering therefore works like conventional hydraulic power steering. In the other operating state, the steering device is disconnected from the steered vehicle wheels, and the servo motor is controlled by a control system as a function of a difference between a first value correlated with the steering angle of the steered wheels of the vehicle and a second value correlated at least with the adjusting travel of the steering device. In this state, the steering therefore works according to the "steer by wire" concept.

To switch between the two operating states at need, a reversing valve arrangement connects the servo motor either with the motor connections of the servo valve or with the motor connections of the servo valve actuated by the control system. Therefore, in the event that the control system malfunctions, it is possible to switch over to the operating method of the conventional power steering system.

In JP-A-40 19271, the valve arrangement, which is provided for the above-cited switching, normally is in the position provided for the "steer by wire" operating state. The reversing valve arrangement is switched hydraulically from this normal position when the servo valve is actuated with the mechanical forced connection switched on between the steering device and the steered wheels of the vehicle. The servo motor is built in a special manner for this purpose. There are objections to this concept for safety reasons.

A vehicle steering system is described in WO 90/12723 in which the mechanical forced connection, provided for emergency purposes between a steering wheel and the wheels steering the vehicle, is normally separated. In this normal state, a first hydraulic adjusting unit, serving to adjust the steering of the wheels steering the vehicle and a second hydraulic adjusting unit, serving to produce a manual force perceptible at the steering wheel, are actuated. Both adjusting units are controlled by electronics. These control electronics, on one hand, actuate the first hydraulic adjusting unit assigned to the steering wheels of the vehicle in accordance with signals from a nominal value transmitter actuated by the steering wheel for the desired angle of steering. On the other hand, the second hydraulic adjusting unit, assigned to the steering wheel and serving for production of manual power, is actuated by the control electronics, whereby various types of parameters can be taken into consideration. The control electronics create the possibility of adjusting the ratio between the change in steering angle of the wheels steering the vehicle and the change in angle of rotation of the steering wheel to a value desired for good handling of the vehicle, without having to demand an excessive expenditure of force on the part of the driver, because the driver need only overcome the resistance of the second adjusting unit serving to adjust the manual force. The actual forces necessary for the steering adjustment of the wheels steering the vehicle are applied by the first adjusting unit. In the final analysis, an easy, but nevertheless direct steering is thus created, in which a relatively small shift in rotation of the steering wheel leads to a clear change in angle of steering of the wheels steering the vehicle. only in emergency cases is a mechanical forced connection switched in between the steering wheel and the wheels steering the vehicle. Comparatively indirect steering, i.e., a relatively large shift in rotation of the steering wheel leads to only a relatively small change in the angle of steering of the steered wheels of the vehicle, must be accepted in this system for limiting the manual force necessary.

A conventional power steering is described in DE 44 09 928 A1, in which the steering wheel is constantly connected mechanically with the steered wheels of the vehicle. A pump serving as a source of hydraulic pressure is combined with a hydraulic pressure accumulator which can be charged by the pump as required or maintained at a specified boost pressure. The pressure accumulator is connected over a pressure line controlled by a check valve to a pressure connection of the servo valve. This pressure connection is also connected with the delivery side of the pump over a control line, in which a throttle is located. In phases, in which there is no need for servo support, the servo valve is in an open central position, in which the above-cited pressure connection is connected with both the servo motor connections and a low-pressure connection. Thereby, the servo valve is connected with a relatively low-pressure hydraulic reservoir. The hydraulic stream flowing over the above-mentioned control line from the pump to the servo valve is fed to the reservoir over the servo valve, as long as the servo valve is in the state with its open center. If, now, during a steering maneuver, the servo valve is increasingly shifted, increasing throttle resistance arises between the pressure connection and the low-pressure connection of the servo valve with the consequence that the hydraulic pressure in the control line increases sharply. This pressure is transmitted to a control input of the control valve between the pressure accumulator and the servo valve with the consequence that the control valve is now opened and the pressure line released, that is, the pressure connection of the servo valve is connected with the pressure accumulator. Thus, a sufficiently large hydraulic stream, supplied under high pressure from the pressure accumulator and/or pump, is available for producing a larger servo force.

An object of the present invention is to ensure a high degree of safety for a power steering system of the above-described type.

This object has been accomplished owing to the fact that the servo motor can be connected over normally-open reversing valves with the motor connections of the servo valve and over normally closed reversing valves with the motor connections of the control valve and these reversing valves can be controlled by the control system into their other position only if the control system is working properly.

In the present invention, therefore, the reversing valve arrangement normally is in the position necessary in the event of a malfunctioning of the control system, i.e., when the steering is supposed to work as a conventional hydraulic power steering system. Only when the control system is operating perfectly can the reversing valve arrangement assume the other position for the "steer by wire" operating mode, provision having been made for the control system to carry out this valve reversal.

The present inventive system excels due to the greatest degree of safety, since it is possible, without anything further, for the connection to switch without delay into its closed state and thus produce the mechanical connection between steering device and the steering wheels of the vehicle as soon as errors are detected in the control system which, in a manner known in principle, can constantly check itself for error-free function.

With the connection open, in principle, certain conversion relationships can be realized between the steering device and the steering wheels of the vehicle. In addition, when the nominal values for the steering angle of the steering wheels of the vehicle are specified, disruptive forces affecting the vehicle, such as crosswinds or other parameters, such as, for example, yaw rate, can be taken into consideration.

BRIEF DESCRIPTION OF THE DRAWINGS

Other objects, advantages and novel features of the present invention will become apparent from the following detailed description of the invention when considered in conjunction with the accompanying drawings wherein:

The sole figure is a wiring diagram-like schematic representation of the power steering of the present invention.

DETAILED DESCRIPTION OF THE DRAWINGS

A steering wheel 1 is, in a manner known in principle, connected by a steering column 2 with a pinion 3 which meshes with a steering rack 4 connected, by a steering tie rod 5 with the steering wheels 6 of the vehicle so that vehicle steering wheels 6 are steered in the appropriate direction when the steering wheel 1 is turned to the left or the right.

Between the pinion 3 and the steering column 2, a rotary-type servo valve 7 is arranged and has two control parts that are connected to each other in a torsionally-elastic manner by a torsion bar (not shown), of which one part is connected, non-rotationally, to the pinion 3 and one part is connected, non-rotationally, to the steering column 2. As a function of the torque transferred between the pinion 3 and the steering column 2, the two control parts of the servo valve 7 are rotated more or less relative to each other to control servo valve 7 in the manner explained below.

An input line 8 connects the servo valve 7 with the delivery side of hydraulic pump 9 which is connected at the inlet side to the hydraulic reservoir 10, with which servo valve 7 is connected over the outlet line 11. In addition, the servo valve 7 is connected to two motor lines 12, 13 that each communicate with a chamber of double-acting piston-cylinder unit 14 serving as servo motor in the illustrated embodiment, the piston of which is disposed on a piston rod continuing the steering rack 4. The system thus far described is a conventional power steering system.

In the present invention, a connection 15 is disposed in the steering column 2 for separating the mechanical drive connection between the steering wheel 1 and the steered wheels 6. On the steering wheel side of the connection 15, a manual force adjuster 16 is disposed on the steering column 2 and is formed, for example, as a non-self-locking electromotor. In this way, a controllable actuation resistance can be created at the steering wheel 1, particularly when the connection 15 is open.

Normally-open check valves 17, 18 and 19 are located in the inlet line 8 as well as in the motor lines 12, 13. These check valves 17, 18 and 19 can each be switched into a closed position by assigned electromagnets against the force of restoring springs. As soon as the electric current supplied to the electromagnets is switched off, the valves 17, 18 and 19 return to the open position shown.

From the delivery side of the hydraulic pump 9, an additional line 20 leads, over nonreturn valve 21 which prevents backflow into pump 9, to a pressure accumulator 22 as well as to a connection to a slide valve arrangement 23. An additional connection from this slide valve arrangement 23 is connected to the hydraulic reservoir 10 over a return flow line 24. Two additional connections from the slide valve arrangement 23 are connected with the motor lines 12, 13 over lines 25, 26 which are controlled by check valves 27, 28, between the check valves 18 and 19 and piston-cylinder unit 14.

The slide valve arrangement 23 is forced by a spring arrangement into the illustrated middle position, in which lines 25, 26 are shut off from the other two connections of the slide valve arrangement 23. Electromagnets shift the slide valve arrangement 23 in two opposing directions in such a manner that a more or less sharply throttled or unthrottled passage is opened either between the pressure accumulator 22 and the line 25, and the line 26 and the line 24, or between the pressure accumulator 22 and the line 25, and the line 25 and the line 24.

The check valves 27, 28 can be switched from their illustrated normally-closed position into their open position against the force of restoring springs also by electromagnets. When the electric current supplied to the electromagnets is switched off, the check valves 27, 28 return to the illustrated closed position.

The valves 17 through 19 and 23 as well as 27, 28 are actuated by control electronics 29 that also control the manual force adjuster 16, and can control the pump 9. On the inlet side, the control electronics 29 are connected to a sensor 30 for the rotational position of the steering wheel 1 as well as a sensor 31 whose signals reproduce the steering angle of the steered vehicle wheels 6. Furthermore, the control electronics 29 are connected on the inlet side with a pressure sensor 32 that records the pressure in pressure accumulator 22.

In describing the operation of the system, it is assumed that the connection 15 is closed and all the check valves 15 through 18 and 27, 28 are in the illustrated positions. In this event, the steering operates like conventional power steering. The slide parts of the servo valve 7 are shifted relative to one another to an extent which depends on the torque transferred over the steering column 2. This results in the fact that, when the hydraulic pump 9 is operating between the motor lines 12, 13, a more or less large pressure difference arises in one or the other direction, depending on the direction of the torque, and that the piston-cylinder unit 14 produces a correspondingly large servo force in one or the other direction, so that the manual force to be applied at steering wheel 1 during the respective steering maneuver is clearly reduced.

If necessary, the control electronics 29 can operate the manual force adjuster 16 as a function of specified parameters, such as the driving speed, so that the resistance perceptible at the steering wheel 1 is changed in a specifiable manner.

An essential characteristic feature of the present invention resides in the fact that with specifiable driving conditions that can be determined by the sensors (not shown) communicating with the control electronics 29, the connection 15 is opened. The control electronics 29 then switch all of the check valves 17 through 19 and 27, 28 into their other, not shown position. This results in the fact that the servo valve 7 becomes inoperative and in particular, can no longer communicate with the piston-cylinder unit 14. Rather, the piston-cylinder unit 14 is now connected with the slide valve arrangement 23 which is actuated by the control electronics 29. In this manner, the slide valve arrangement 23 is actuated so that, in the final analysis, the actual value of the steering angle of the wheels 6 steering the vehicle, determined by the sensor 30, corresponds to a nominal value specified by the angle of rotation of the steering wheel 1 determined by the sensor 30. Here, practically any desired conversion ratios can be created between the angle of rotation of the steering wheel 1 and the steering angle of the steered wheels 6.

In this manner, the conversion ratio can be changed particularly as a function of the speed of rotation of the steering wheel 1 that can also be determined by the sensor 30.

With this method of operation, the pressure difference can be varied at the piston-cylinder unit 14 in one or the other direction by the separate slide valve device 23, depending on the deviation of the actual from the nominal value, so that the piston-cylinder unit 14 brings about the desired steering motion of the wheels 6.

As soon as the desired steering angle is set, the slide valve arrangement 23 is returned to the illustrated closed position shown, in which the piston-cylinder unit 14 is blocked hydraulically. Since the piston-cylinder unit 14 is also now separated from the hydraulic pump 9, the pressure accumulator 22 is recharged until the pressure sensor 32 reports that the upper pressure threshold has been reached. The pump 9 can then be shut down. As soon as the control valve arrangement 23 subsequently is triggered out of the closed center position because a new steering maneuver is to occur, hydraulic pressure is supplied to the piston-cylinder unit 14 by the pressure accumulator 22. In addition, the hydraulic pump 9 is switched on again as soon as the pressure falls below the lower threshold value at the pressure sensor 32.

Optionally, the hydraulic pump 9 can also run continuously. Here the circulated, unnecessary oil can flow through the valve 17 to control the valve 7 and through its open center over the flow return line 11 into the tank. The valves 18, 19 are closed here, while the control valve 23 is active.

With the connection 15 open, the control electronics 29 also constantly control the manual force adjuster 16 so that an adjusting resistance is perceptible at the steering wheel 1. Conditions, similar to those created by a mechanical connection between steering wheel 1 and wheels 6 can be simulated at the steering wheel 1.

If the control electronics 29 are provided with appropriate sensors (not shown), they can also execute special steering maneuvers in order, for example, to stabilize the vehicle after or during a crosswind gust or to halt a skidding motion.

Control electronics 29 constantly monitors itself for correct operation. As soon as an error has been detected, the current supplied to the electromagnets of the reversing valves 17 through 18 and 27, 28 is immediately shut off so that these valves switch to the illustrated positions. At the same time, the actuator for the connection 15, generally an electric one, is cut off from the power supply so that the connection 15 is switched to its closed position by a closing spring or the like. As a result, this creates a return to conventional power steering with the mechanical connection between the steering wheel 1 and the wheels 6 steering the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Power steering system for a vehicle with a mechanical drive connection between a steering device and a steering gear arrangement for steering wheels of the vehicle, comprising a servo motor connected to the steering gear arrangement, connection for separating the drive connection, the servo motor being controllable with the connection in an open position, over a control valve configured to be controlled by a control system as a function of a difference between a first value correlated with the steering angle of the vehicle wheels and a second value correlated at least with the adjusting travel of the steering device, and a servo valve configured to be controlled analogously to forces or moments transferred by the drive connection and couplable with the drive connection for controllably connecting the servo motor with pressure and low-pressure connections such that the servo motor produces servo power reducing the actuating force necessary at the steering device, the servo motor being connected by a reversing valve arrangement with one of motor connections of the control valve and motor connections of the servo valve, wherein the servo motor is configured to be connected over normally opened reversing valves with the motor connections of the servo valve and over normally closed reversing valves with the motor connections of the control valve, the reversing valve arrangement configured to be controlled into a respective other position only in a proper working condition of a control system.

2. The power steering system of claim 1, wherein the servo valve has an open center.

3. The power steering system of claim 1, wherein the separate control valve has a closed center.

4. The power steering system of claim 1, wherein a pressure accumulator is operatively arranged at a line connecting a servo pump on delivery side thereof with the separate control valve, and a nonreturn valve is arranged to prevent return flow in the direction of the pump.

5. The power steering system of claim 1, wherein the servo motor is connectable over normally-open reversing valves with motor connections of the servo valve and over normally-closed reversing valves with motor connections of the separate control valve.

6. The power steering system of claim 1, wherein the servo motor is connectable over normally-open reversing valves with motor connections of the servo valve and over normally-closed reversing valves with motor connections of the separate control valve.

7. The power steering system of claim 3, wherein the servo valve has an open center.

8. The power steering system of claim 4, wherein the servo valve has an open center.

9. The power steering system of claim 4, wherein the separate control valve has a closed center.

10. The power steering system of claim 5, wherein a pressure accumulator is operatively arranged at a line connecting a servo pump on delivery side thereof with the separate control valve, and a nonreturn valve is arranged to prevent return flow in the direction of the pump.

11. The power steering system of claim 8, wherein the separate control valve has a closed center.

12. The power steering system of claim 11, wherein a pressure accumulator is operatively arranged at a line connecting a servo pump on delivery side thereof with the separate control valve, and a nonreturn valve is arranged to prevent return flow in the direction of the pump.

* * * * *